(12) United States Patent
Reddy et al.

(10) Patent No.: US 7,813,308 B2
(45) Date of Patent: Oct. 12, 2010

(54) SYSTEM AND METHOD FOR LOCATION-BASED CONFIGURATION OF AN INFORMATION HANDLING SYSTEM

(75) Inventors: Sridhar Reddy, Austin, TX (US); Troy Tiritilli, Round Rock, TX (US); Jason Kilpatrick, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 333 days.

(21) Appl. No.: 12/038,145

(22) Filed: Feb. 27, 2008

(65) Prior Publication Data

US 2009/0213756 A1 Aug. 27, 2009

(51) Int. Cl.
*H04J 3/24* (2006.01)
*H04L 12/28* (2006.01)
*H04Q 7/20* (2006.01)

(52) U.S. Cl. ............... 370/312; 370/390; 370/400; 370/432; 455/440; 379/201.06; 379/207.12

(58) Field of Classification Search ............ 379/201.06, 379/207.12; 455/440
See application file for complete search history.

(56) References Cited

U.S. PATENT DOCUMENTS

| | | | |
|---|---|---|---|
| 6,807,573 B2 | 10/2004 | Saito et al. | 709/220 |
| 7,007,010 B2 | 2/2006 | Cooper | 707/3 |
| 7,103,040 B2 | 9/2006 | Aalbers et al. | 370/388 |
| 7,310,686 B2 | 12/2007 | Uysal | 709/245 |
| 7,383,326 B1 | 6/2008 | Himberger et al. | 709/220 |
| 7,424,532 B1 | 9/2008 | Subbiah | 709/226 |
| 7,607,174 B1 * | 10/2009 | Kashchenko et al. | 726/25 |
| 7,620,065 B2 * | 11/2009 | Falardeau | 370/465 |
| 2007/0168471 A1 | 7/2007 | Childress et al. | 709/220 |
| 2007/0275717 A1 * | 11/2007 | Edge et al. | 455/434 |

* cited by examiner

*Primary Examiner*—Ayaz R Sheikh
*Assistant Examiner*—Blanche Wong
(74) *Attorney, Agent, or Firm*—Baker Botts L.L.P.

(57) ABSTRACT

A system and method for location-based configuration of an information handling system are disclosed. A method may include detecting an available network for communication with the information handling system. Based on at least the detected available network, a current location of the information handling system may be determined. Based on the determined current location of the information handling system, one or more parameters of the information handling system associated with the determined current location may be automatically configured.

14 Claims, 7 Drawing Sheets

FIG. 1

| LOCATION PROFILE NAME | HOME | WORK-NY | WORK-LA | AIRPORT | CAFE |
|---|---|---|---|---|---|
| NETWORK NAME [NETWORK TYPE] | ISP [WAN]<br>HomeWiFi [WLAN] | EthernetNY [LAN]<br>WiFiNY [WLAN] | EthernetLA [LAN]<br>WiFiLA [WLAN] | AirportWiFi [WLAN] | HotSpot [WWAN] |
| PRINTERS LIST | HomePrint | PrinterNY1<br>PrinterNY2 | PrinterLA1<br>PrinterLA2 | | |
| INTERNET START PAGE | http://www.dell.com/ | http://intranet/ | http://intranet/ | http://www.dell.com/ | http://www.dell.com/ |
| VIRTUAL PRIVATE NETWORK | On | Off | Off | On | On |

SYSTEM AND METHOD FOR LOCATION-BASED CONFIGURATION OF AN INFORMATION HANDLING SYSTEM

TECHNICAL FIELD

The present disclosure relates in general to network configuration, and more particularly to a system and method for configuration of a network requiring little or no user input.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The use of networking in information handling systems has become increasingly ubiquitous in recent years. In fact, many information handling systems are often equipped to communicate with networks via a plurality of networking technologies, standards, and protocols. For example, an information handling system may be able to communicate with one or more local area networks (LANs) (e.g., via Ethernet connections), one or more wireless LANs (WLANs) (e.g., via a Wireless Fidelity or "Wi-Fi" connection), one or more wide area networks (WANs) (e.g., via a dial-up and/or leased line connection), and one or more wireless wide area networks (WWANs) (e.g., via a third-generation wireless or "3G" connection). In addition, information handling systems, particularly portable information handling systems (also known as "laptops" or "notebooks") are often able to connect to different networks based on the location of the particular information handling system. For example, an information handling system may couple to a first network while it is at one location (e.g., its user's place of employment), and may couple to a second network while at another location (e.g., its user's home).

However, when moving an information handling system from location to location, a user must often reconfigure various location-based settings for the information handling system. For example, when taking home an information handling system from a place of employment to home, a user may have to reconfigure various parameters, including without limitation printer settings (e.g., default printer), Internet start page, virtual private network (VPN) settings (e.g., enabled or disabled), Bluetooth settings (e.g., enabled or disabled), global positioning system (GPS) settings (e.g., enabled or disabled), Ultra-Wide Band module settings, mapped network drives, shared folders, security settings (e.g., whether Internet connection sharing, printer sharing, folders sharing, and/or a firewall should be enabled or disabled), applications settings (e.g., which applications to launch when information handling system is at a particular location), and/or other parameters. When the user returns to work, the parameters may again need to be reconfigured. Such manual configuration may sometimes also include selection of the "best" network to use at a particular location (e.g., if a LAN and WLAN are available, it may be considered better to connect to a LAN).

Accordingly, a need has arisen for systems and methods that intelligently configure information handling system parameters based on a location of the information handling system.

SUMMARY

In accordance with the teachings of the present disclosure, disadvantages and problems associated with configuring an information handling system for network connectivity may be substantially reduced or eliminated.

In accordance with one aspect of the present disclosure, a method for location-based automatic configuration of an information handling system may be provided. The method may include detecting an available network for communication with the information handling system. Based on at least the detected available network, a current location of the information handling system may be determined. Based on the determined current location of the information handling system, one or more parameters of the information handling system associated with the determined current location may be automatically configured.

In accordance with another aspect of the present disclosure, an information handling system may include a processor, a memory communicatively coupled to the processor, a network interface communicatively coupled to the processor, and a computer-readable medium having stored thereon a program of instructions. The program of instructions may be operable to, when executed: (a) detect an available network communicatively coupled to the network interface; (b) based on at least the detected available network, determine a current location of the information handling system; and (c) based on the current location of the information handling system, automatically configure one or more parameters of the information handling system associated with the determined current location.

In accordance with a further aspect of the present disclosure, a program of instructions may be embodied in a computer-readable medium. The program of instructions may be operable to, when executed: (a) detect an available network communicatively coupled to an information handling system; (b) based on at least the detected available network, determine a current location of the information handling system; and (c) based on the determined current location of the information handling system, automatically configure one or more parameters of the information handling system associated with the determined current location.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-3E, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory, as well as communications media such wires, optical fibers, microwaves, radio waves, and other electromagnetic and/or optical carriers; and/or any combination of the foregoing.

For the purposes of this disclosure, the term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present disclosure over electrical power lines, electrical power distribution systems, building electrical wiring, conventional telephone lines, Ethernet cabling (10baseT, 100baseT, etc.), coaxial cables, T-1 lines, T-3 lines, ISDN lines, ADSL, and/or any other suitable medium.

For the purposes of this disclosure, the term "wireless transmissions" may be used to refer to all types of electromagnetic communications which do not require a wire, cable, or other types of conduits. Examples of wireless transmissions which may be used include, but are not limited to, personal area networks (PAN) (e.g., BLUETOOTH), local area networks (LAN), wide area networks (WAN), narrowband personal communications services (PCS), broadband PCS, circuit switched cellular, cellular digital packet data (CDPD), radio frequencies, such as the 800 MHz, 900 MHz, 1.9 GHz and 2.4 GHz bands, infra-red and laser.

Examples of wireless transmissions for use in local area networks (LAN) include, but are not limited to, radio frequencies, especially the 900 MHZ and 2.4 GHz bands, for example IEEE 802.11 and BLUETOOTH, as well as infrared, and laser. Examples of wireless transmissions for use in wide area networks (WAN) include, but are not limited to, narrowband personal communications services (nPCS), personal communication services (PCS such as CDMA, TMDA, GSM) circuit switched cellular, and cellular digital packet data (CDPD), etc.

Figure 1:
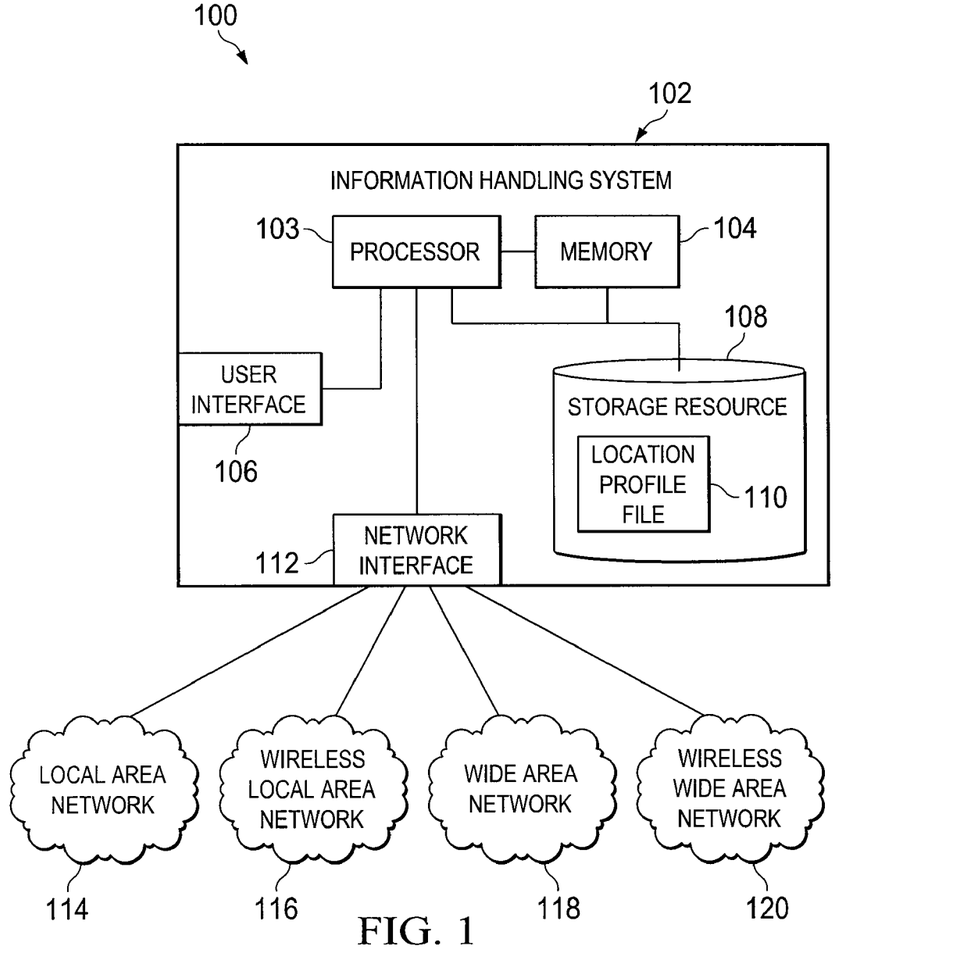
FIG. 1 illustrates a block diagram of an example network system, in accordance with an embodiment of the present disclosure.

FIG. 1 illustrates a block diagram of an example network system 100, in accordance with an embodiment of the present disclosure. As depicted, system 100 may include an information handling system 102, a local area network (LAN) 114, a wireless LAN (WLAN) 116, a wide area network (WAN) 118, and a wireless WAN (WWAN) 120. In this disclosure, LAN 114, WLAN 116, WAN 118 and WLAN 120 each may be referred to generally as a "network." In addition, LAN 114, WLAN 116, WAN 118 and WLAN 120 may be referred to collectively as "networks 114-120."

Information handling system 102 may generally be operable to receive data from, and/or transmit data to networks 114-120. In some embodiments, information handling system 102 may be a portable computer (e.g., a "laptop" or "notebook"). As shown in FIG. 1, information handling system 102 may include a processor 103, a memory 104 communicatively coupled to processor 103, a user interface 106, a local storage resource 108, and a network interface 112.

Processor 103 may comprise any system, device, or apparatus operable to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, or any suitable selection and/or array of volatile or non-volatile memory that retains data after power to information handling system 102 is turned off.

User interface 106 may be communicatively coupled to processor 103 and may include any instrumentality or aggregation of instrumentalities by which a user may interact with information handling system 102. For example, user interface 106 may permit a user to input data and/or instructions into information handling system 102 (e.g., via a keyboard, pointing device, and/or other suitable means), and/or otherwise manipulate information handling system 102 and its associated components. User interface 106 may also permit information handling system 102 to communicate data to a user, e.g., by means of a display device.

Local storage resource 108 may be communicatively coupled to processor 103 and/or memory 104 and may include any system, device, or apparatus operable to retain program instructions or data for a period of time (e.g., computer-readable media) and that retains data after power to information handling system 102 is turned off. Local storage resource 108 may include one or more hard disk drives, magnetic tape libraries, optical disk drives, magneto-optical disk drives, compact disk drives, compact disk arrays, disk array controllers, and/or any computer-readable medium operable to store data. As depicted in FIG. 1, storage resource 108 may include location profile file 110. Location profile file 110 may include any database, table, and/or other data structure operable to store data regarding configuration parameters of information handling system 102, and the locations to which those configuration parameters apply, as shown in greater detail in FIG. 2.

Figure 2:
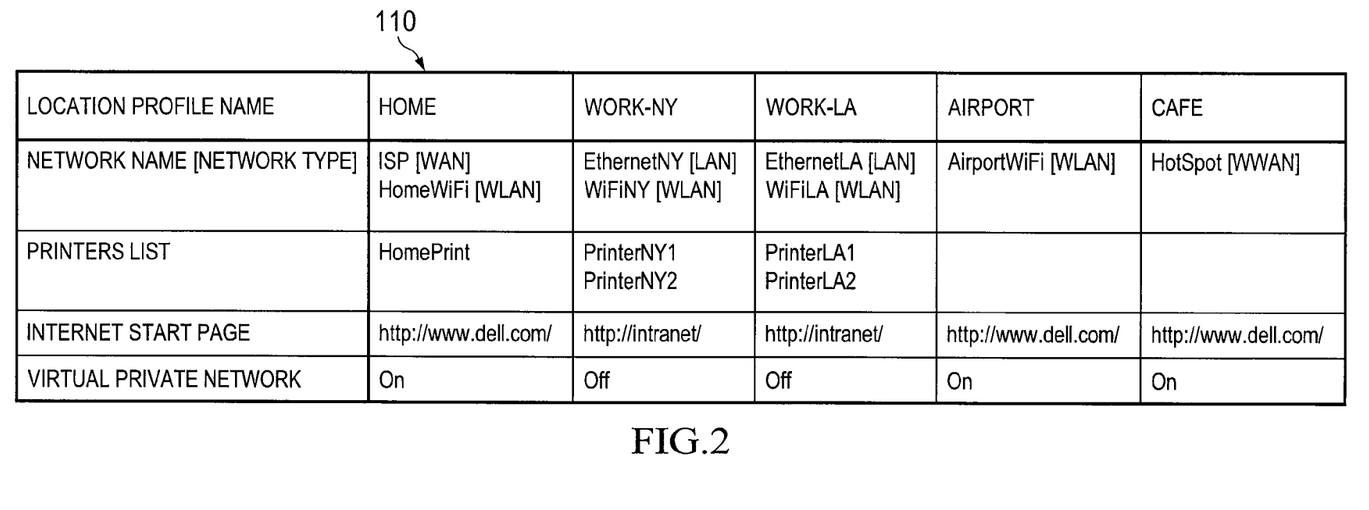
FIG. 2 illustrates example contents of a location profile file, in accordance with an embodiment of the present disclosure.
Figure 3A:
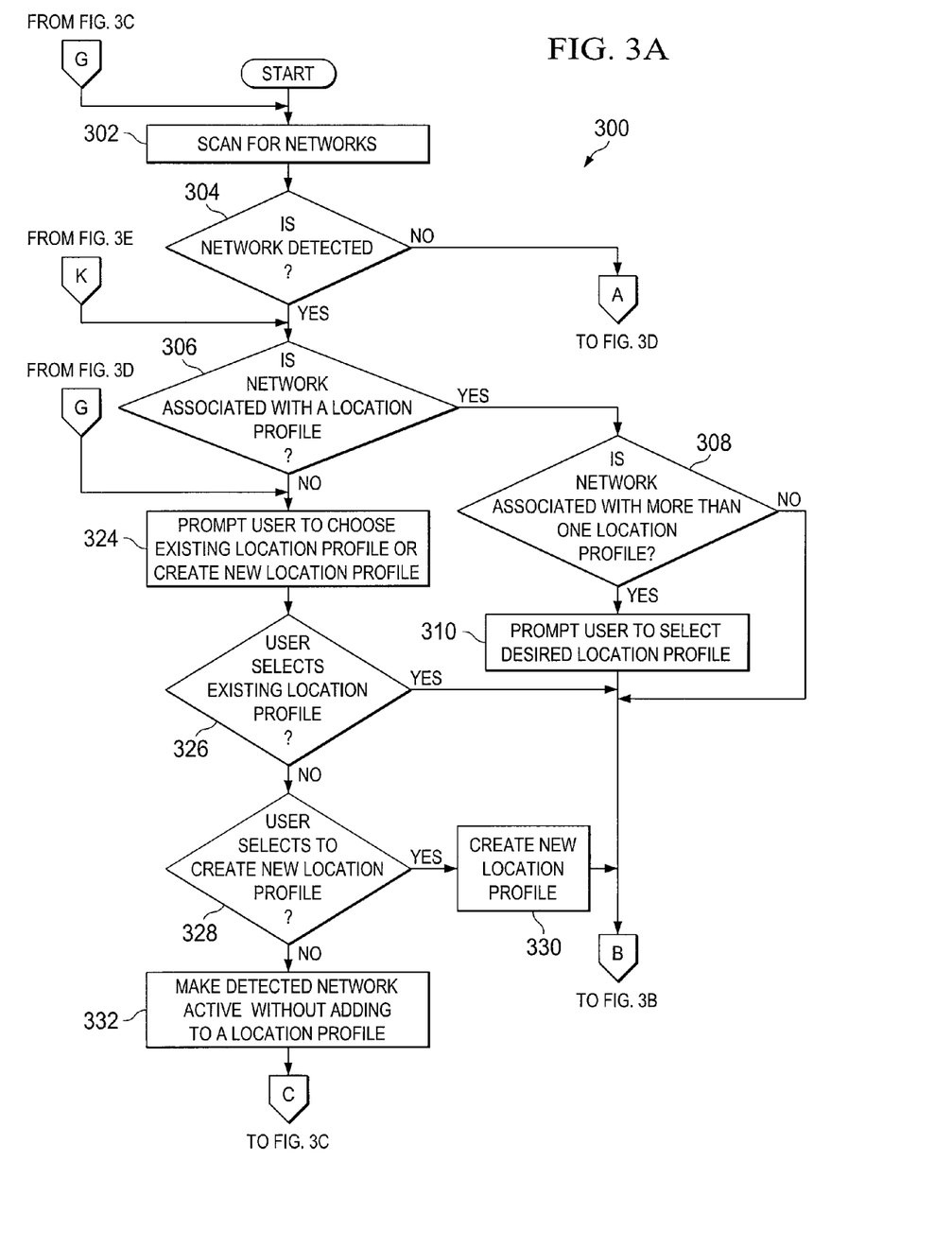
FIGS. 3A-3E illustrate a flow chart of an example method for location-based configuration of an information handling system.
Figure 3B:
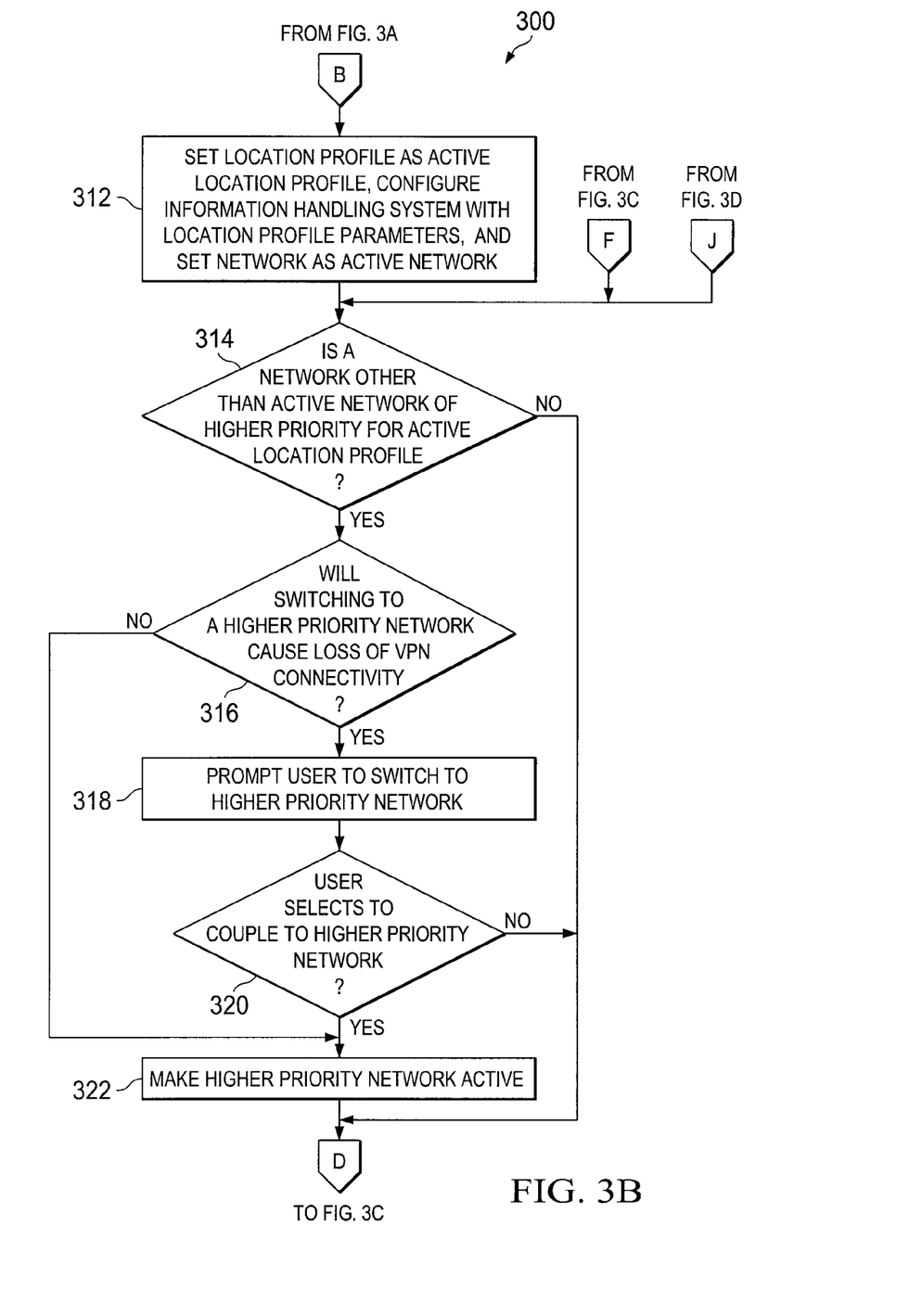
Figure 3C:
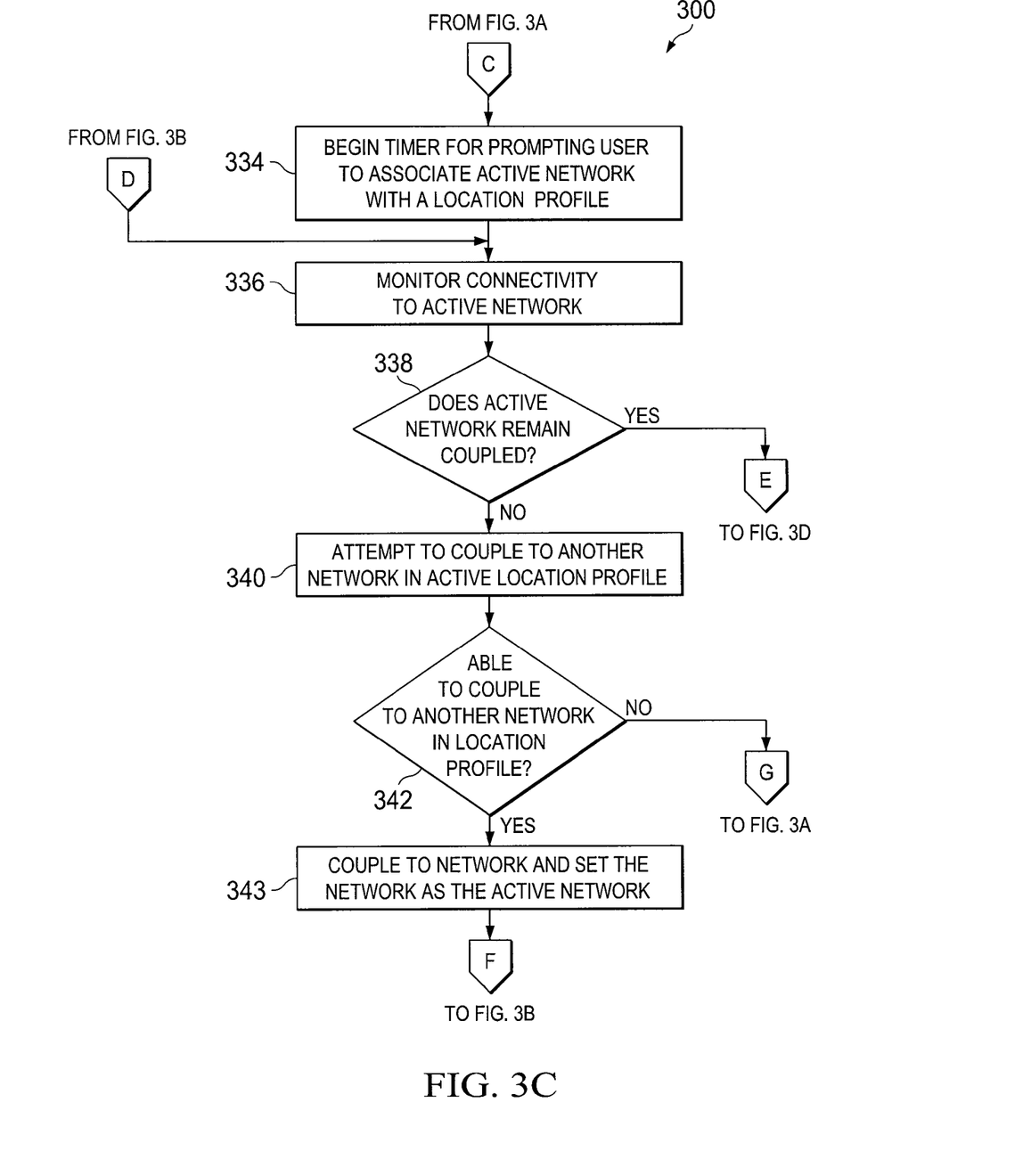
Figure 3D:
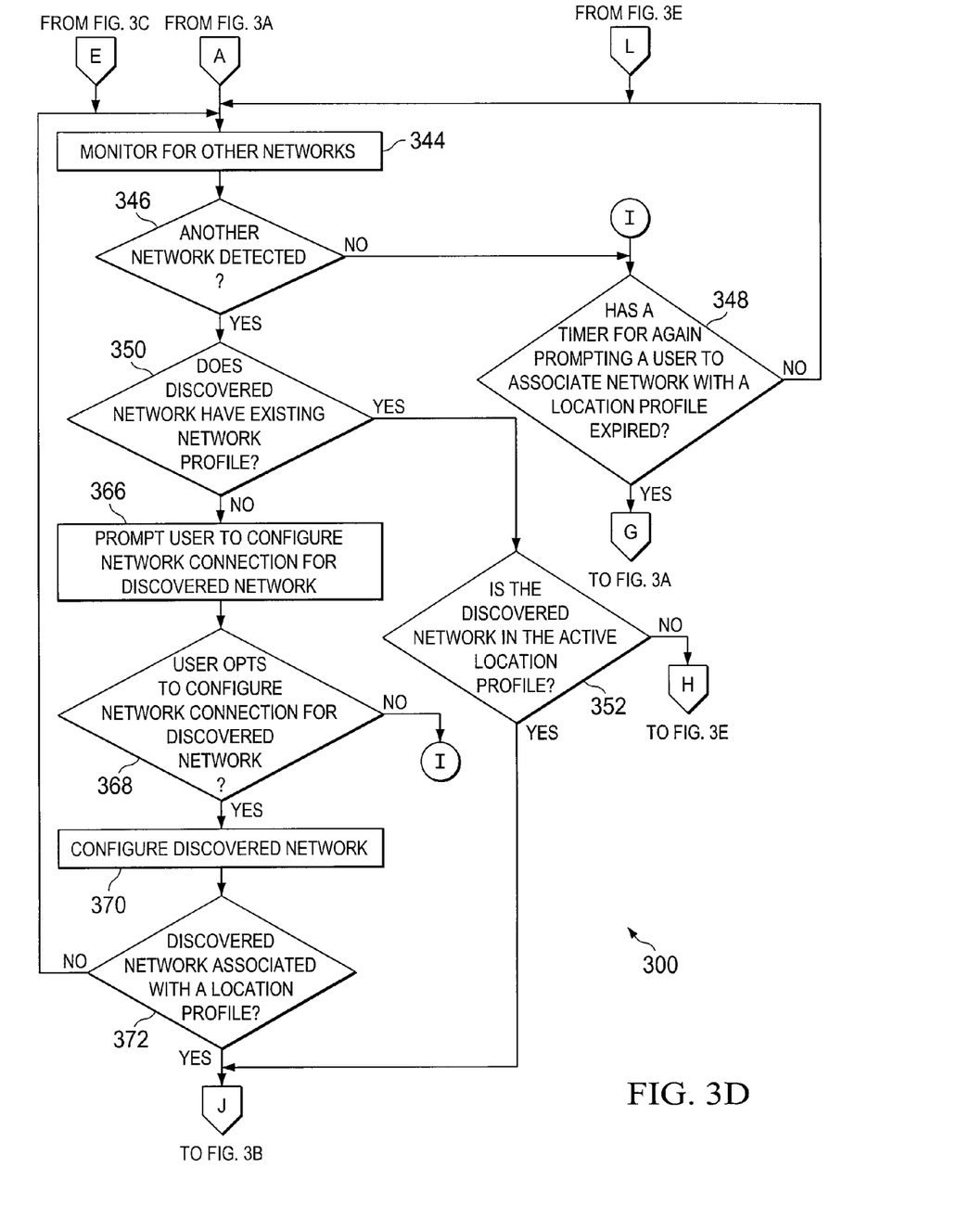
Figure 3E:
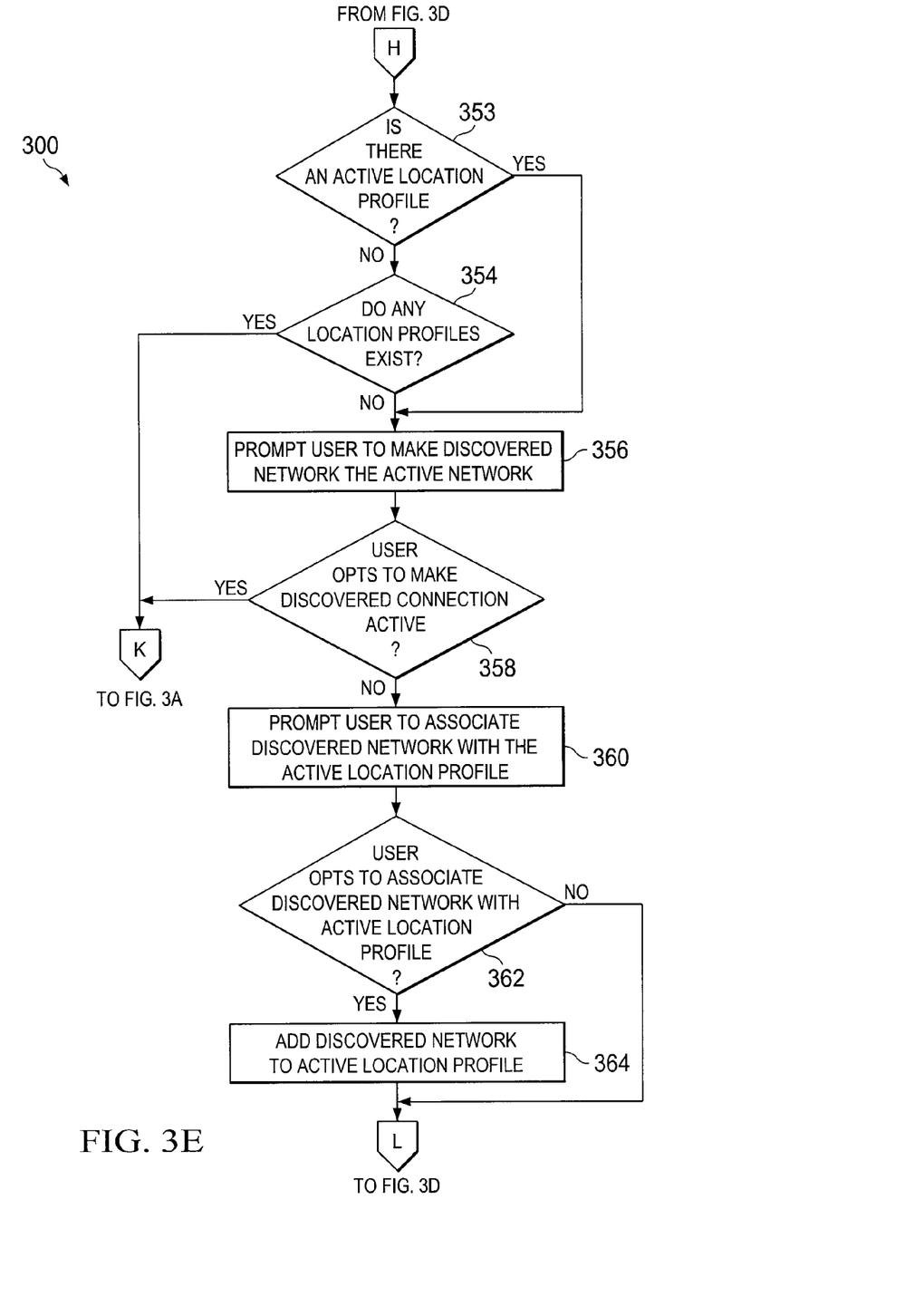

FIG. 2 illustrates example contents of a location profile file 110, in accordance with an embodiment of the present disclosure. As shown in FIG. 2, location profile file 110 may contain one or more locations associated with information handling system 102. For example, location profile file 110 may include a location profile named HOME corresponding to configuration parameters associated with the information handling system 102 while being used in its user's home. Other location profiles may correspond to other locations in which a user may use the information handling system (e.g., WORK-NY for a user's New York-based office, WORK-LA for a user's Los Angeles-based office, AIRPORT for use in an airport, and CAFE for use in coffee shop.

Location profile file 110 may also include various configuration parameters associated with each location. For example, location profile file 110 may include network names, printers, and Internet start pages associated with each location, as well as whether a virtual private network (VPN) tunnel should be on or off for each location. Thus, when information handling system 102 is at location HOME, it may couple to a WAN network named "ISP" (e.g., a dial-up Internet service provider) and/or a WLAN network named "HomeWiFi" (e.g., a WiFi network), may print to printer named "HomePrint," may have "http://www.dell.com" as its default Internet browser start page, and may have VPN on. Similarly, when information handling system 102 is at location WORK-NY, it may couple to a LAN network named "ISP" (e.g., via an Ethernet connection) and/or a WLAN network named "WiFiNY" (e.g., a WiFi network), may print to printer named "PrinterNY1" and/or "PrinterNY2" may have "http://intranet/" as its default Internet browser start page, and may have VPN off.

In addition, location profile file 110 may track priority assigned to the various networks associated with a location. For example, at location HOME, it may be preferable for information handling system 102 to couple to network ISP rather than network HomeWiFi, which may be indicated by virtue of network ISP being listed above network HomeWiFi in location profile file 110. Accordingly, when information handling system 102 is brought into location HOME, it will attempt to configure connectivity to the network connection with the highest priority, if such network is available.

Although FIG. 2 depicts that each location profile may include parameters regarding network names, network types, printers, Internet start page, and VPN connectivity, location profiles may include any suitable parameters and/or settings for information handling system 102, particularly any such parameters that vary based on a location of information handling system 102.

Turning again to FIG. 1, network interface 112 may include any suitable system, apparatus, or device operable to serve as an interface between information handling system 102 and networks 114-120. Network interface 112 may enable information handling system 102 to communicate to networks 114-120 using any suitable transmission protocol (e.g., TCP/IP) and/or standard (e.g., IEEE 802.11, Wi-Fi). In certain embodiments, network interface 112 may include a network interface card (NIC). In the same or alternative embodiments, network interface 112 may provide physical access to a networking medium and/or provide a low-level addressing system (e.g., through the use of Media Access Control addresses).

LAN 114 may include any network suitable to communicatively couple information handling systems and/or other components to each other via wire-line transmissions in a relatively small geographic area. For example, LAN 114 may permit information handling systems and/or other components to communicate with each other via cable, fiber optics link, and/or other suitable device using Ethernet, token ring, fiber distributed data interface (FDDI), ARCNET, and/or another suitable communications standard/transmission protocol. In certain embodiments, LAN 114 may serve information handling systems and/or other components located substantially close together (e.g., generally in the same building and/or within approximately two miles of each other). In the same or alternative embodiments, LAN 114 may allow users to share software, hardware, and/or data.

WLAN 116 may include any network suitable to communicatively couple information handling systems and/or other components to each other via wireless transmissions in a relatively small geographic area. In certain embodiments, WLAN 116 may serve information handling systems and/or other components located substantially close together (e.g., generally in the same building and/or group of buildings). In the same or alternative embodiments, WLAN 116 may allow users to share software, hardware, and/or data. WLAN 116 may couple to network interface 112 via the IEEE 802.11 standard (e.g., "Wi-Fi").

WAN 118 may include any network suitable to communicatively couple information handling systems and/or other components to each other via wire-line transmissions in a relatively large geographic area. For example, WAN 118 may permit information handling systems and/or other components to communicate with each other via a leased line, circuit switch (e.g., phone line), and/or a packet switch using Point-to-Point Protocol (PPP), High-Level Data Link Control (HDLC) Protocol, Synchronous Data Link Control (SDLC) Protocol, Integrated Services Digital Network (ISDN), and/or other suitable protocol.

WWAN 120 may include any network suitable to communicatively couple information handling systems and/or other components to each other via wireless transmissions in a relatively large geographic area. For example, WWAN 120 may permit information handling systems and/or other components to communicate with each other via cellular network technologies (e.g., 3G and/or another suitable cellular technology).

Although FIG. 1 depicts information handling system 102, coupled to networks 114-120, any suitable number and/or type of networks (e.g., personal area networks, metropolitan area networks, campus area networks) may be coupled to information handling system 102.

FIGS. 3A-3E illustrate a flow chart of an example method 300 for location-based configuration of an information handling system. According to one embodiment, method 300 preferably begins at step 302. As noted above, teachings of the present disclosure may be implemented in a variety of configurations of system 100. As such, the preferred initialization point for method 300 and the order of the steps 302-372 comprising method 300 may depend on the implementation chosen.

At step 302, information handling system 102 may scan for networks 114-120 with which it may communicate. In some embodiments, step 302 may execute after a user boots and/or logs into information handling system 102. At step 304, information handling system 102 may determine whether a network 114-120 was detected. If a network 114-120 is not detected, method 300 may proceed to step 344. Otherwise, if a network 114-120 is detected, method 300 may proceed to step 306.

At step 306, information handling system 102 may determine whether the detected network 114-120 is associated with a location profile stored in location profile file 110. For example, referring to FIG. 2, if HomeWiFi is the detected network 114-120, information handling system 102 may determine that the detected network 114-120 is associated with location profile HOME. If the detected network 114-120 is associated with a location profile, method 300 may proceed to step 308. Otherwise, if the detected network 114-120 is not associated with a location profile, method 300 may proceed to step 324.

At step 308, information handling system 102 may determine if the detected network 114-120 is associated with more than one location profile. If the detected network 114-120 is associated with more than one location profile, method 300 may proceed to step 310. If the detected network 114-120 is associated with only one location profile, method 300 may proceed to step 312.

At step 310, in response to a determination that the detected network 114-120 is associated with more than one location profile, information handling system 102 may prompt the user to select one of the associated location profiles. At step 312, the information handling system 102 may set the detected network 114-120 as the active network, set the location profile associated with the active network as the active location profile, may configure itself with parameters associated with the location profile, and communicatively couple to the active network. For example, if the detected network is HomeWiFi, information handling system 102 may configure itself to communicate with network HomeWiFi, set the active network as WiFi, set the active location profile to HOME, and configure itself to use printer HomePrint, Internet start page http://www.dell.com/, enable VPN, and other parameters associated with location profile HOME.

At step 314, information handling system 102 may determine if a network 114-120 other than the active network has a higher priority within the active location profile. For example, if network HomeWiFi was detected at step 304, information handling system 102 may determine that network ISP is of higher priority for the active location profile HOME. If a network 114-120 of higher priority is associated with the active location profile, method 300 may proceed to step 316. Otherwise, method 300 may proceed to step 336.

At step 316, information handling system 102 may determine if switching from the active network to a higher priority network 114-120 will cause loss of VPN connectivity. If switching to the higher priority network 114-120 will cause loss of VPN connectivity, method 300 may proceed to step 318. Otherwise, if switching to the higher priority network 114-120 will not cause loss of VPN connectivity, method 300 may proceed to step 322.

At step 318, in response to a determination that switching to a higher priority network 114-120 may cause loss of VPN connectivity, information handling system 102 may prompt a user to switch to the higher priority network 114-120. At step 320, information handling system 102 may determine whether the user desires to switch to the higher priority network 114-120. If the user desires to switch to the higher priority network 114-120, method 300 may proceed to step 322. Otherwise, if the user does not desire to switch to the higher priority network 114-120, method 300 may proceed to step 336. At step 322, in response to a determination that the user desires to switch to the higher priority network 114-120, information handling system may set the higher priority network 114-120 as the active network. After completion of step 322, method 300 may proceed to step 336.

At step 324, in response to a determination that a detected network 114-120 is not associated with a location profile (see steps 306 and 348), information handling system 102 may prompt a user to choose an existing location profile from the list of location profiles stored in location profile file 110 or to create a new location profile. At step 326, information handling system 102 may determine whether the user has selected an existing location profile to use. If the user selects an existing location profile, method 300 may proceed to step 312 where information handling system 102 may be configured with parameters associated with the selected location profile. Otherwise, if the user does not select an existing location profile, method 300 may proceed to step 328.

At step 328, information handling system 102 may determine whether the use has selected the option to create a new location profile. If the user opts to create a new location profile, method 300 may proceed to step 330. Otherwise, if the user does not opt to create a new location profile, method 300 may proceed to step 332.

At step 330, in response to a determination that a user opts to create a new user profile for the detected network 114-120, information handling system 102 may create a new location profile to be stored in location profile file 110. After completion of step 330, method 300 may proceed to step 312 where information handling system 102 may be configured with parameters associated with the newly-created location profile and may associate the newly-created location profile with the detected network 114-120.

At step 332, in response to a determination that a user opts not to create a new user profile for the detected network 114-120 and set the detected network as the active network, information handling system 102 may configure itself to communicate with the detected network 114-120 without associating the network 114-120 to a location profile. At step 334, information handling system 102 may begin a timer for later prompting the user to associate the detected network 114-120 with a location profile.

At step 336, information handling system 102 may monitor its connectivity to the network 114-120 to which it was most-recently configured for network communication. At step 338, information handling system 102 may determine whether it remains coupled to the active network 114-120. If information handling system 102 determines it is not longer coupled to the active network 114-120, method 300 may proceed to step 340. Otherwise, if information handling system 102 remains coupled to the active network 114-120, method 300 may proceed to step 344.

At step 340, information handling system 102 may attempt to couple to another network 114-120 in the active location profile. At step 342, information handling system 102 may determine whether it is able to couple to another network 114-120 in the active location profile. If information handling system 102 is able to couple to another network 114-120 in the active location profile, method 300 may proceed to step 343. Otherwise, if information handling system 102 is unable to couple to another network 114-120 in the active location profile, method 300 may proceed to step 302. At step 343, in response to a determination that information handling system 102 is able to couple to another network 114-120 in the active location profile, information handling system 102 may configure itself for communication with such network 114-120 and set the network as the active network. After completion of step 343, method 300 may proceed to step 314.

At step 344, in response to a determination that information handling system 102 remains connected to a network 114-120 (step 338) or cannot initially detect a network 114-120 which to connect (step 304), information handling system 102 may monitor for other networks 114-120. At step 346, information handling system 102 may determine if another network 114-120 is detected. If another network 114-120 is not detected, method 300 may proceed to step 348. Otherwise, if another network 114-120 is detected, method 300 may proceed to step 350.

At step 348, in response to the determination that another network 114-120 has not been detected (step 346) or that a user opts not to configure a discovered network (step 368), information handling system 102 may determine whether a timer for again prompting a user to associate a network 114-120 with a location profile has expired (see step 334). If the timer has not expired, method 300 may proceed to step 344, where information handling system 102 may again monitor for other networks 114-120. Otherwise, if the timer has expired, method 300 may proceed to step 324, where the user may be prompted again to add the previously-detected network 114-120 to a location profile.

At step 350, in response to the detection of another network 114-120, information handling system 102 may determine whether the discovered network 114-120 has an existing network profile and/or configuration stored on storage resource 108. If an existing network profile and/or configuration does not exist for the discovered network 114-120, method 300 may proceed to step 366. Otherwise, if an existing network profile and/or configuration exists for the discovered network 114-120, method 300 may proceed to step 352.

At step 352, in response to a determination that the discovered network 114-120 has an existing network profile, information handling system 102 may determine whether the discovered network 114-120 is in the active location profile. If the discovered network 114-120 is not in the active location profile, method 300 may proceed to step 353. Otherwise, if the discovered network 114-120 is in the active location profile, method 300 may proceed to step 314.

At step 353, in response to a determination that the discovered network 114-120 is not in the active location profile, information handling system 102 may determine whether there exists an active location profile. If there is an active location profile, method 300 may proceed to step 356. Otherwise, if there is not an active location profile, method 300 may proceed to step 354.

At step 354, if response to a determination that there is no active location profile, information handling system 102 may determine whether any location profiles exist in location profile file 110. If no location profiles exist in location profile file 110, method 300 may proceed to step 356. Otherwise, if one or more location profiles exist in location profile file 110, method 300 may proceed to step 306.

At step 356, information handling system 102 may prompt a user whether to set the discovered network 114-120 as the active network for communication with information handling system 102. At step 358, information handling system 102 may determine whether the user opts to set the discovered network 114-120 as the active network. If the user opts to set the discovered network 114-120 as the active network, method 300 may proceed to step 306. Otherwise, if the user does not opt to set the discovered network 114-120 as the active network, method 300 may proceed to step 360.

At step 360, information handling system 102 may prompt a user whether to associate the discovered network 114-120 with the active location profile if an active location profile exists. At step 362, information handling system 102 may determine whether the user opts to associate the discovered network 114-120 with the active location profile. If the user opts to associate the discovered network 114-120 with the active location profile, method 300 may proceed to step 364. Otherwise, if the user opts not to associate the discovered network 114-120 with the active location profile, method 300 may proceed to step 344.

At step 364, in response to determining that a user desires to add the discovered network 114-120 to the active location profile, information handling system 102 may add the discovered network 114-120 to the active location file. After completion of step 364, method 300 may proceed to step 344.

At step 366, if response to determining that a discovered network does not have an existing network profile (see step 350), information handling system 102 may prompt a user of information handling system 102 to configure a network connection for the discovered network. At step 368, information handling system 102 may determine whether the user opts to configure a network connection for the discovered network. If the user opts to configure a network connection for the discovered network, method 300 may proceed to step 370. Otherwise, if the user does not opt to configure a network connection for the discovered network, method 300 may proceed to step 348.

At step 370, information handling system 102 may configure a network connection for the discovered network according to user preferences. In certain embodiments, configuring a network connection may include associating the network with a location profile. At step 372, information handling system 102 may determine if the discovered network has been associated with a location profile. If the discovered network has been associated with a location profile, method 300 may proceed to step 314. Otherwise, if the discovered network has not been associated with a location profile, method 300 may proceed to step 344.

Although FIGS. 3a-3E disclose a particular number of steps to be taken with respect to method 300, it is understood that method 300 may be executed with greater or lesser steps than those depicted in FIGS. 3A-3E. In addition, although FIGS. 3A-3E disclose a certain order of steps to be taken with respect to method 300, the steps comprising method 300 may be completed in any suitable order. Method 300 may be implemented using system 100 or any other system operable to implement method 300. In certain embodiments, method 300 may be implemented partially or fully in software embodied in tangible computer-readable media.

Using the methods and systems disclosed herein, a network system may be provided that allows for the location-based auto-configuration of information handling system parameters and/or settings, thus reducing or eliminating difficulties associated with configuration of an information handling system. For example, when a user transports an information handling system to a different location, the information handling system may detect a network at the location and determine the location of the information handling system. Having determined the location, the information handling system may then set various parameters and/or settings based on the location. In addition, having determined the location, the information handling system may determine which network associated with that location has the highest priority, thus allowing the information handling system to connect to the "best" network available.

Although the present disclosure has been described in detail, it should be understood that various changes, substitutions, and alterations can be made hereto without departing from the spirit and the scope of the invention as defined by the appended claims.

What is claimed is:

1. A method for location-based automatic configuration of an information handling system, comprising:
   detecting an available network for communication with the information handling system;
   reading a location profile file having one or more location profiles, each location profile associated with a configured location and including one or more configuration parameters associated with its respective configured location;
   based on at least the detected available network, determining a current location of the information handling system, wherein determining the current location of the information handling system comprises determining, from the location profile file, if the detected available network is associated with a configured location having a location profile; and
   based on the determined current location of the information handling system, automatically configuring one or more parameters of the information handling system associated with the determined current location.

2. A method according to claim 1, wherein determining the current location of the information handling system based on at least the detected available network comprises accessing one or more user predefined associations between one or more networks and one or more locations to identify a location associated with the determined available network.

3. A method according to claim 1, wherein automatically configuring the one or more parameters of the information handling system associated with the determined current location comprises:
   from the location profile file, determining the one or more configuration parameters associated with the determined current location; and
   automatically configuring the information handling system with the one or more configuration parameters associated with the determined current location.

4. A method according to claim 1, further comprising:
   determining whether a second network other than the detected network has a higher priority at the determined current location;
   in response to determining that the second network has higher priority than the detected network, setting the second network as active; and
   in response to determining that the second network has lower priority than the detected network, setting the detected network as active.

5. A method according to claim 1, wherein the one or more parameters includes at least one of: a network configuration parameter associated with the determined current location, a printer configuration parameter associated with the determined current location, an Internet configuration parameter associated with the determined current location, a virtual private network parameter associated with the determined current location, a Bluetooth parameter associated with the determined current location, a global positioning system parameter associated with the determined current location, an Ultra-Wide Band parameter associated with the determined current location, a mapped network drive parameter associated with the determined current location, a shared folder parameter associated with the determined current location, a security parameter associated with the determined current location, and an application parameter associated with the determined current location.

6. An information handling system comprising:
   a processor;
   a memory communicatively coupled to the processor;
   a network interface communicatively coupled to the processor; and
   a computer-readable medium having stored thereon:
      a location profile file having one or more location profiles, each location profile associated with a configured location and including one or more configuration parameters associated with its respective configured location; and
      a program of instructions operable to, when executed:
         detect an available network communicatively coupled to the network interface;
         based on at least the detected available network, determine a current location of the information handling system by determining, from the location profile file, if the detected available network is associated with a configured location having a location profile; and
         based on the current location of the information handling system, automatically configure one or more parameters of the information handling system associated with the determined current location.

7. An information handling system according to claim 6, the program of instructions further operable to determine the current location of the information handling system based on at least the detected available network by accessing one or more user predefined associations between one or more networks and one or more locations to identify a location associated with the determined available network.

8. An information handling system according to claim 6, the program of instructions further operable to automatically configure the at least one parameter of the information handling system associated with the determined current location by:
   from the location profile file, determining the one or more configuration parameters associated with the determined current location; and
   automatically configuring the information handling system with the one or more configuration parameters associated with the determined current location.

9. An information handling system according to claim 6, the program of instructions further operable to:
   determine whether a second network other than the detected network has a higher priority at the determined current location;
   in response to determining that the second network has higher priority than the detected network, set the second network as active; and
   in response to determining that the second network has lower priority than the detected network, set the detected network as active.

10. An information handling system according to claim 6, wherein the one or more parameters includes at least one of: a network configuration parameter associated with the determined current location, a printer configuration parameter associated with the determined current location, an Internet configuration parameter associated with the determined current location, a virtual private network parameter associated with the determined current location, a Bluetooth parameter associated with the determined current location, a global positioning system parameter associated with the determined current location, an Ultra-Wide Band parameter associated with the determined current location, a mapped network drive parameter associated with the determined current location, a shared folder parameter associated with the determined current location, a security parameter associated with the determined current location, and an application parameter associated with the determined current location.

11. A program of instruction embodied in a non-transitory computer-readable medium, the program of instruction operable to, when executed:
    detect an available network communicatively coupled to an information handling system;
    read a location profile file having one or more location profiles, each location profile associated with a configured location and including one or more configuration parameters associated with its respective configured location;
    based on at least the detected available network, determine a current location of the information handling system by determining, from the location profile file, if the detected available network is associated with a configured location having a location profile; and
    based on the determined current location of the information handling system, automatically configure one or more parameters of the information handling system associated with the determined current location.

12. A program of instructions according to claim 11, the program of instructions further operable to determine the current location of the information handling system based on at least the detected available network by accessing one or more user predefined associations between one or more networks and one or more locations to identify a location associated with the determined available network.

13. A program of instructions according to claim 11, further operable to automatically configure the at least one parameter of the information handling system associated with the determined current location comprises:
    from the location profile file, determining the one or more configuration parameters associated with the determined current location; and
    automatically configuring the information handling system with the one or more configuration parameters associated with the determined current location.

14. A program of instructions according to claim 11, further operable to:
    determine whether a second network other than the detected network has a higher priority at the determined current location;
    in response to determining that the second network has higher priority than the detected network, set the second network as active; and
    in response to determining that the second network has lower priority than the detected network, set the detected network as active.

* * * * *